United States Patent [19]

Scheuring

[11] Patent Number: 5,332,308
[45] Date of Patent: Jul. 26, 1994

[54] PROCESS AND APPARATUS FOR PRODUCTION OF PLASTICS CONTAINING ADDITIVES

[75] Inventor: Bernhard Scheuring, Stuttgart, Fed. Rep. of Germany

[73] Assignee: Werner & Pfleiderer GmbH, Stuttgart, Fed. Rep. of Germany

[21] Appl. No.: 967,103

[22] Filed: Oct. 27, 1992

[30] Foreign Application Priority Data

Oct. 30, 1991 [DE] Fed. Rep. of Germany ....... 4135675

[51] Int. Cl.[5] ............ B01F 7/08; B28C 7/06
[52] U.S. Cl. .................... 366/76; 366/85; 366/158; 366/181; 425/208
[58] Field of Search ........ 366/76, 79, 83–85, 366/88, 90, 133, 156, 158, 177, 181, 318; 425/204, 207, 208

[56] References Cited

U.S. PATENT DOCUMENTS

| | | | |
|---|---|---|---|
| 1,496,896 | 6/1924 | Laffoon | 366/337 |
| 2,102,255 | 12/1937 | Campbell | 366/156 |
| 3,312,374 | 4/1967 | Whitlock | 366/181 |
| 3,704,076 | 11/1972 | Bodunov | 366/156 |
| 3,843,757 | 10/1979 | Ehrenfreund | 425/204 |
| 3,868,093 | 2/1975 | Sokolow | 366/88 |
| 4,428,679 | 1/1984 | Fischer | 366/177 |
| 4,459,028 | 7/1984 | Bruder | 366/181 |
| 4,514,163 | 4/1985 | Nakamura | 366/90 |
| 4,544,279 | 10/1985 | Rudolph | 366/177 |
| 4,649,005 | 3/1987 | Kobayashi | 425/204 |
| 4,938,605 | 7/1990 | Friedrich | 366/97 |

FOREIGN PATENT DOCUMENTS

| | | | |
|---|---|---|---|
| 3145376 | 5/1983 | Fed. Rep. of Germany | 366/79 |
| 140356 | 12/1978 | Japan | 366/133 |
| 1110524 | 5/1986 | Japan | 366/79 |
| 98823 | 7/1961 | Netherlands . | |
| 1211059 | 2/1986 | U.S.S.R. | 366/79 |
| 1487967 | 6/1989 | U.S.S.R. | 366/79 |

*Primary Examiner*—Timothy F. Simone
*Assistant Examiner*—Terrance R. Till
*Attorney, Agent, or Firm*—Ladas & Parry

[57] ABSTRACT

A process and apparatus for the production of plastic material containing an additive in which the plastic material is supplied into a mixing tank to undergo vigorous mixing therein and the mixed plastic material is discharged by an extrusion screw at the bottom of the tank into a conveying cylinder in which the extrusion screw extends. The mixed plastic material is conveyed by the screw in the conveying cylinder for discharge of the plastic material at a discharge outlet. The plastic material is heated in the conveying cylinder to achieve melting of the plastic material and the additive is supplied to the melted plastic material within the conveying cylinder so that the additive is thoroughly mixed with the melted plastic material before discharge thereof at the discharge outlet.

12 Claims, 2 Drawing Sheets

PROCESS AND APPARATUS FOR PRODUCTION OF PLASTICS CONTAINING ADDITIVES

FIELD OF THE INVENTION

The invention relates to a process and apparatus for producing plastics containing additives and more particularly, to such a process and apparatus which the additives are supplied to the plastics when the latter are in a molten state.

The invention generally relates to the supply of various types of additives to plastic material and include, but are not limited to, incorporating reinforcing materials and fillers with plasticizable plastic compounds.

BACKGROUND AND PRIOR ART

DE OS 3 720 325 and its equivalent U.S. Pat. No. 4,938,605 discloses the production of a so-called fillermaster batch, in which the components of a mixture are first premixed in a two-stage mixing process and the thus-obtained intermediate product further mixed in a twin-screw mixing and kneading machine known as a Z-type kneader and then the mixed product is discharged by a screw extending at the bottom of the mixing tank to a discharge cylinder.

The plastics, which are present in powder or liquid form as initial materials, are introduced with pre-measured amounts of filler into a mixing and kneading machine, serving as a preliminary stage in order to mix and distribute the fillers into the low-viscous or molten plastics.

In contrast to this relatively expensive procedure, it is often possible to effect melting of the plasticizable compounds and mixing of the fillers therein in a single mixing process.

It is also known to first melt the plasticizable compounds in a mixing and kneading machine, such as in a Z-type kneader, and then to mix the filler or reinforcing material into the plastic melt. In order to effect melting of the plasticizable compound in the kneading machine, a sufficient heat transfer from the heatable kneading machine to the mixed material must be provided, while a small portion of heat is introduced into the plasticizable compound by shearing energy via the mixing blades of the kneader.

This procedure, however, not only requires a high energy input, but the quality of the produced plastic product is not always satisfactory.

SUMMARY OF THE INVENTION

An object of the invention is to provide a process and apparatus for improving the preparation of plasticizable compounds so that an increase in quality is obtained with reduced energy expenditure for plasticizing.

According to the invention, the above and further objects are achieved by conveying mixed plastic material in a conveying cylinder wherein the plastic material is melted after which an additive is added to the molten plastic material in the conveying cylinder. The molten plastic material with the additive undergoes mixing in the conveying cylinder by an extruder screw therein so that a thoroughly mixed molten plastic containing additive uniformly distributed therein is discharged from the conveying cylinder.

According to the invention, the above and further objects are also achieved by an apparatus in which the plastic material is introduced into a mixing tank and discharged therefrom by an extruder screw into the conveying cylinder wherein the plastic material is melted and the additive is supplied to the melted plastic material downstream of the mixing tank. In order to effect the melting of the plastic material, a heating means is provided in the conveying cylinder in a region between the mixing tank and the location where the additive is supplied to the conveying cylinder.

According to a feature of the invention, it was surprisingly found that by melting the polymer to be plasticized outside the mixing tank, a basic improvement in the quality of the plastic compound to be formed can be obtained. This is explained by the fact that the specific residence time of the polymer in the mixing tank remains constant. Since the melting process and the mixing process take place in different spaces, the melting time and the mixing time remain constant for the particles of the compound. Thermal and mechanical damage after a mixing cycle, due to residual quantities of solid material remaining in the mixing tank or in the conveying cylinder, is practically eliminated.

It is also of particular importance that the melting and discharge process takes place in a single unit, i.e. in the conveyor device, so that during the input of the molten polymer, a flushing of the input unit occurs and of any remaining abrasive particles are introduced into the mixing tank with the molten polymer. As a result, there is an increased service life of the extruder screw acting as an input means.

Since the melting time is basically reduced in the extruder screw in comparison with the otherwise usual melting time in the mixing tank and idle times caused by this are eliminated, there is a basically reduced cycle time as well as a clearly smaller heat energy requirement.

In a further embodiment of the invention according to which the pre-measured amount of additive is added after completion of the supply of the polymer melt to the mixing tank, the mixing of the filler is promoted.

In accordance with the apparatus of the invention, the extruder screw serves for combining the additive with the polymer in the conveyor cylinder whereby melting of the polymer plastic can be achieved separate from the mixing tank and its mixing unit. In this way, heating of the mixing tank which is both time consuming and requires a large structure is eliminated, and a considerable savings in energy is associated therewith. A reduction of the melting time caused by the relatively small volume of the conveying cylinder makes possible a reduction in the total mixing time. The extruder screw which is already present for discharge of the mixed material can be utilized for the further function of melting the polymer.

This also makes possible the desired elimination of residual monomer prior to the input of the melt into the mixing tank. Since a degassing is conducted in the conveyor cylinder of the extruder screw, a vacuum which promotes degassing can be applied in a simple way.

In another embodiment of the invention, two extruder screws which mutually scrape and clean one another are provided in the extruder housing, whereby an efficient melting operation and degassing are obtained. The intensified mixing action in the conveyor cylinder which is obtained in this way during the discharge of the mixed material advantageously contributes to a reduction in the total mixing time.

A reverse transfer of the polymer and the additive is provided, according to another embodiment of the invention, in a semicontinuous operation. In this way, measuring operations can be conducted during the melting or mixing cycles. The materials which will be introduced are vented prior to introduction into the mixing tank or into the conveyor cylinder, so that air inclusions caused by packing are eliminated.

DETAILED DESCRIPTION OF A PREFERRED EMBODIMENT

Figure 1:
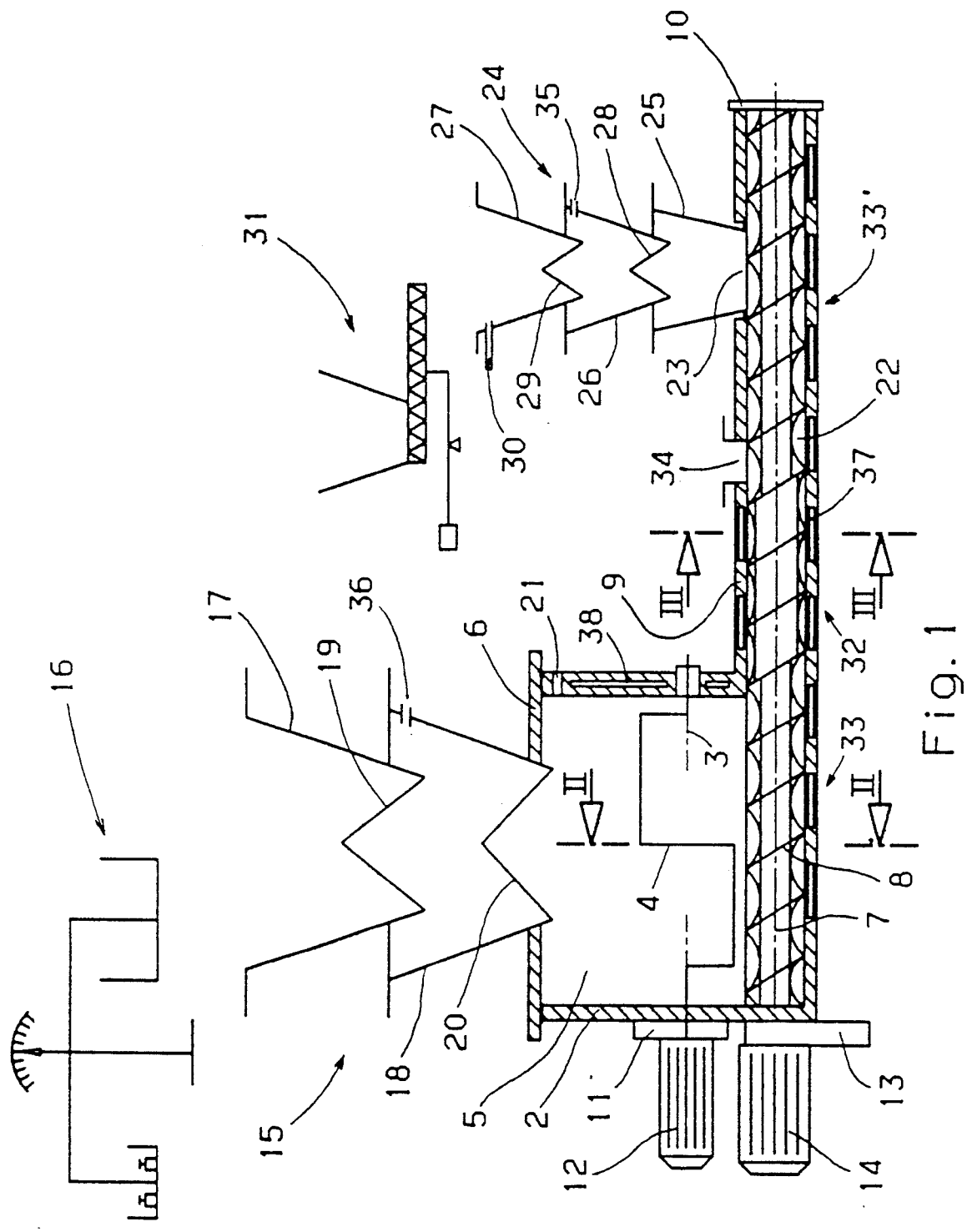
FIG. 1 is a diagrammatic sectional view of a mixing and kneading machine according to the invention.

A mixing and kneading machine 1 is shown in FIG. 1 having a mixing tank 2 containing dual mixing and kneading blades 4 rotating around parallel horizontal axes 3, 3'. A mixing chamber 5 in mixing tank 2 is closed by a cover 6. A vent opening 21 is formed in the wall of the mixing tank 2 directly underneath cover 6. At the bottom of mixing tank 2 an extruder screw 8 is supported for rotation around an axis 7 extending parallel to the axes of rotation 3, 3' of the mixing and kneading blades 4. The screw 8 extends beyond tank 2 into a conveyor cylinder 9 mounted on the front wall of mixing tank 2. At the outlet end of a bore 22 in conveyor cylinder 9 is a perforated plate 10 for shaping the mixed material discharged under the action of extruder screw 9.

The mixing and kneading blades 4 are driven by an electric motor 12 through a step-down gearing 11, while extruder screw 8 is driven by an electric motor 14 through a reversing gear 13.

Figure 2:
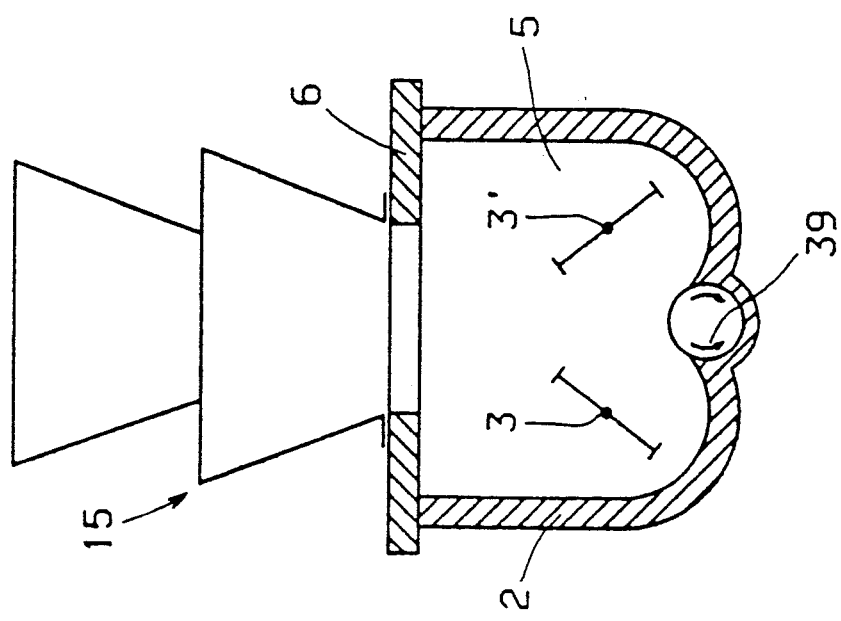
FIG. 2 is a cross-sectional view taken on line II—II in FIG. 1.

By means of the reversing gear 13, the extruder screw 8 can be driven in opposite directions of rotation as shown by arrows 39 (FIG. 2), so that the conveying direction of the material by extruder screw 8 can be in the direction of perforated plate 10 for discharge or in the direction of mixing chamber 5 for prolonged treatment.

For the addition of measured amounts of filler, reinforcing material or other additives, cover 6 is rigidly connected to a hopper transfer unit 15. The hopper transfer unit 15 is, in turn, arranged below a metering device 16 for the addition of measured amounts of materials according to weight. The hopper transfer unit 15 consists of a first hopper 17 for receiving the measured amount of material and a second hopper connected to hopper 17 and serving as a vacuum chamber for specified storage of the measured material from hopper 17, the hopper 18 being formed with a vent opening 36. Hoppers 17 and 18 are both equipped with respective pivotal hopper bottoms 19 and 20, so that the measured quantity of material can be emptied into hopper 18 for storage therein or directly added into mixing chamber 5. The operation of the pivotal hopper bottoms is carried out by conventional control means (not shown).

In the region of perforated plate 10, the conveyor cylinder 9 is formed with an opening 22. Thereby the polymer additive can be introduced in powder form to extruder screw 8. This polymer additive is also introduced in a measured quantity through a hopper transfer unit 24 mounted sealingly in opening 23.

The transfer unit 24 comprises three hoppers 25, 26, 27 sealingly mounted one above the other, hoppers 26 and 27 having pivotal hopper bottoms 28 and 29, respectively. The hopper transfer unit 24 serves for introducing a polymer by weight, from a metering device 31 as well as being "on call" for its storage and controlled output. Conventional drives and control devices, which are not shown, serve for this purpose. For improved treatment of hygroscopic or oxygen-sensitive polymer, hopper 27 has an inlet 30 for nitrogen; the nitrogen is evacuated in subsequent hopper 26 together with residual monomer through suction outlet 35.

After introducing the powder-form polymer by means of hopper transfer unit 24 into conveyor cylinder 9, the polymer is introduced into melting zone 32 of extruder screw 8. Melting zone 32 is formed, in conventional manner, from a transition zone with flat screw threads of reverse pitch, i.e. with a hand opposite the hand of the threads of extruder screw 8 in a conveyor zone 33 in the mixing chamber 5 so that a compression and liquefying of the polymer is produced. Melting zone 32 lies in cylinder 9 outside the region of mixing chamber 5. Upstream of the melting zone 32 is the conveyor zone 33, which opens into mixing chamber 5. A vent opening 34 is arranged downstream in the connection to the conveying zone 33', for removal of residual gas inclusions.

Figure 3:
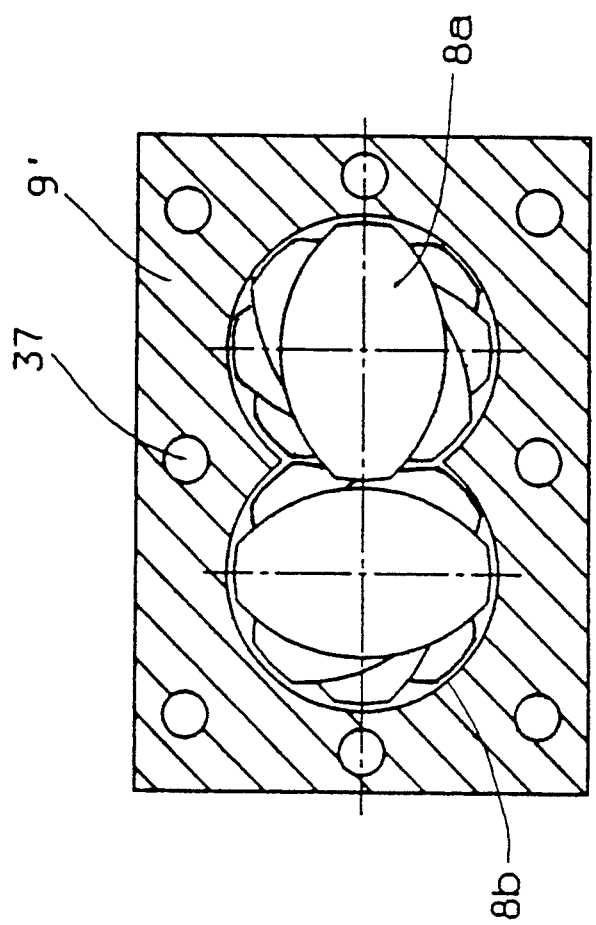
FIG. 3 is a cross-sectional view of another embodiment of the machine taken along line III—III in FIG. 1.

The plastic melt is heated by passage of a heating fluid in channels 37 in the melting zone 32 and the conveyor zone 33. According to FIG. 3, conveyor cylinder 9' is equipped with twin extruder screws supported in two overlapped bores in cylinder 9', the twin screws having interengaging teeth formed by kneading disks 8a, 8b arranged one behind the other. These twin screws are driven in the same direction of rotation and are advantageous if increased shearing energy is to be introduced into the mixed material in order to obtain a better breaking up and distribution of the additives.

For the production of plastics reinforced, for example, with fillers or reinforcing materials such as chalk, kaolin, or carbon fibers, a pre-measured quantity of polymer is first fed into hopper transfer unit 24 and introduced in batches to extruder screw 8 in a controlled manner. This quantity is then conveyed by extruder screw 8 (which can be a single screw or twin screws) into mixing tank 2 and is melted in this way in the extruder screw. After input of the molten compound into mixing tank 2 which can be heated by means of chamber 38 via a heating medium, the pre-measured filler or reinforcing material is also added into mixing tank 2 by means of hopper transfer unit 15.

After charging the mixing tank 2, a homogeneous intermixing or dispersion of the components is produced by the rotatable mixing and kneading blades 4. During the mixing process, the conveyor direction of extruder screw 8 is into mixing tank 2 and this is maintained in order to promote the mixing process. After completion of the mixing operation, the direction of rotation of the conveyor screw is reversed and the mixed material is advanced through the conveyor cylinder and discharged through perforated plate 10.

Although the invention has been described in relation to a specific embodiment thereof, it will become apparent to those skilled in the art that numerous modifications and variations can be made within the scope and spirit of the invention as defined in the attached claims.

What is claimed is:

1. A process for the production of plastic material containing an additive, said process comprising, providing a mixing tank having a rotatable extruder screw at a bottom of the tank, said extruder screw extending from said tank into a conveying cylinder which is connected to said tank, supplying plastic material into said conveying cylinder at an inlet spaced from the mixing tank, conveying the plastic material in said cylinder, by said extruder screw, towards said mixing tank, heating the plastic material in said conveying cylinder to melt the plastic material therein and supply the melted plastic material to said mixing tank, introducing additive into said mixing tank to mix the additive with the melted plastic material in said mixing tank, reversing the direction of rotation of said extruder screw to advance the now mixed additive and melted plastic material from said mixing tank into said conveying cylinder in a direction opposite the direction of travel of the plastic material when the plastic material traveled from said inlet to said mixing tank, and advancing the mixed additive and plastic material in said conveying cylinder to a discharge outlet thereof.

2. A process as claimed in claim 1, comprising supplying heat to the mixture of melted material and additive in said mixing tank.

3. A process as claimed in claim 1, comprising providing a degassing outlet in said conveying cylinder between said inlet and said mixing tank.

4. Apparatus for producing plastic material containing an additive comprising a mixing tank for receiving a measured amount of an additive to be mixed with a plastic material, a rotatable extruder screw in said tank, a conveying cylinder extending from said mixing tank with said extruder screw extending therein, said conveying cylinder having a discharge outlet spaced from said mixing tank, said conveying cylinder further having an inlet for supply of plastic material between said mixing tank and said discharge outlet, means for rotating said extruder screw in opposite directions of rotation, said extruder screw, in one direction of rotation, advancing the plastic material supplied at said inlet through said conveying cylinder to said mixing tank, means for supplying heat to the conveying cylinder between said mixing tank and said inlet for heating the plastic material to melting temperature as the plastic material is conveyed from said inlet to said mixing tank, and means for supplying a measured amount of an additive to said mixing tank for mixing the additive with the melted plastic material introduced into the mixing tank, said extruder screw than being driven in reversed direction of rotation to convey the plastic material with the additive mixed therein through the conveying cylinder to said discharge outlet.

5. Apparatus as claimed in claim 4, wherein said conveying cylinder has a degassing outlet between said mixing tank and said inlet for plastic material.

6. Apparatus as claimed in claim 5, wherein said conveying cylinder comprises a housing having a bore containing said extruder screw, said means for supplying heat to the conveying cylinder comprising heating channels in said housing of said conveying cylinder in an upper region of said housing extending from said mixing tank to said degassing outlet, said housing having a lower region with heating channels extending from said mixing tank to said inlet for the plastic material.

7. Apparatus as claimed in claim 4, wherein said conveying cylinder comprises a housing having two overlapped bores with a respective one said extruder screw in each said bore, the extruder screw in each bore being driven in the same direction as the extruder screw in the other other bore and having teeth which intergage with teeth of the extruder screw in the other bore.

8. Apparatus as claimed in claim 4, comprising supply means for supplying the additive to said mixing tank, said supply means including superposed hoppers with respective openable bottoms.

9. Apparatus as claimed in claim 4, comprising supply means at said inlet of said conveying cylinder for plastic material, said supply means including superposed hoppers with respective openable bottoms.

10. Apparatus as claimed in claim 4, comprising means for supplying heat to said mixing tank.

11. Apparatus as claimed in claim 4, comprising rotatable mixing blades in said mixing rank having axes of rotation parallel to said extruder screw.

12. Apparatus as claimed in claim 4, wherein said conveying cylinder is arranged substantially horizontally.

* * * * *